Oct. 20, 1925.
J. H. BLAIR
1,557,648
METHOD OF SPLICING CANE ENDS
Filed May 31, 1924
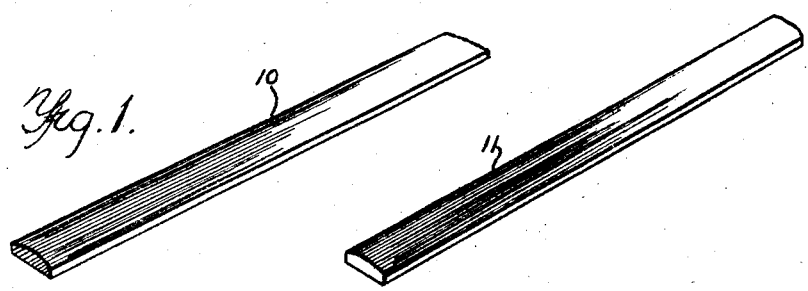
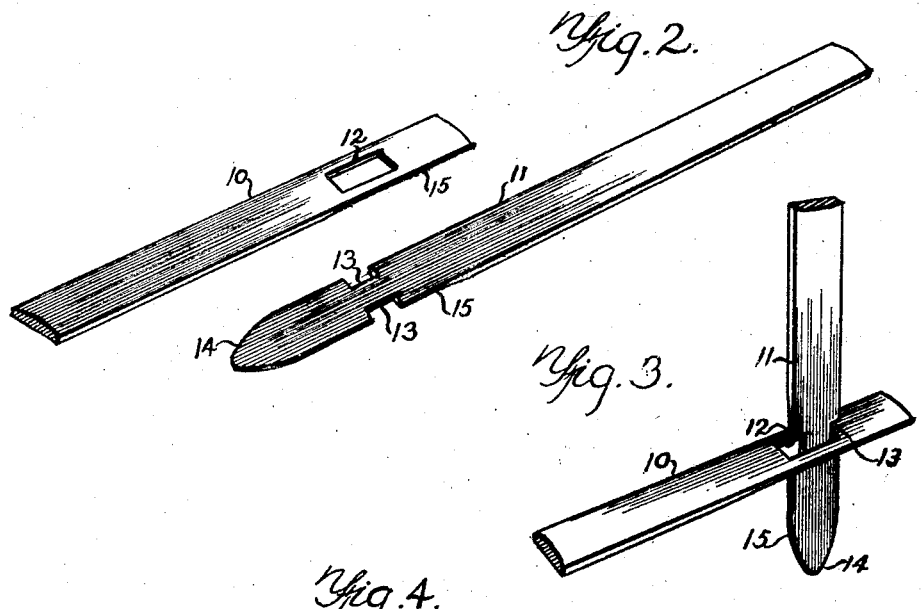
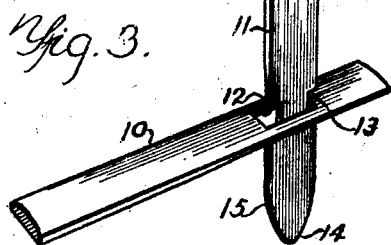
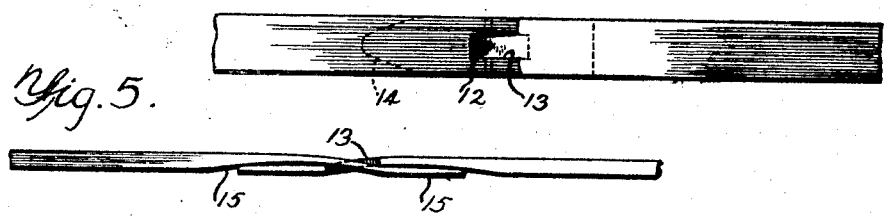
Inventor
Joseph H. Blair
By C. H. Parker
Attorney Patented Oct. 20, 1925.

1,557,648

UNITED STATES PATENT OFFICE.

JOSEPH HENRY BLAIR, OF ST. LOUIS, MISSOURI, ASSIGNOR TO ST. LOUIS CAR COMPANY, OF ST. LOUIS, MISSOURI, A CORPORATION OF VIRGINIA.

METHOD OF SPLICING CANE ENDS.

Application filed May 31, 1924. Serial No. 717,121.

*To all whom it may concern:*

Be it known that I, JOSEPH HENRY BLAIR, a citizen of the United States, residing in the city of St. Louis and State of Missouri, have invented certain new and useful Improvements in Methods of Splicing Cane Ends, of which the following is a specification.

This invention relates to a method of splicing the ends of strip material and more particularly to a method of splicing the ends of cane or rattan to form a continuous strip preparatory to winding it on rolls for use on looms used in weaving cane fabric particularly adapted for making covers for car seats or the like.

Heretofore the usual method of splicing the ends of cane strips has been to taper the ends to be spliced and placing them one against the other with a layer of glue or cement between them and pressing the ends together by a suitable clamp or the like. With the method heretofore in use a raw edge is always left on the outer face of the cane strip which in actual use frequently becomes loose thus separating the ends of the cane strips. When the ends of the cane strips become loose there is no means for holding the ends together.

An important object of the present invention is to provide a splicing method whereby the ends of cane strips may be spliced together without the use of glue if desired.

A further object is the provision of a splicing method wherein the completed joint presents a smooth continuous surface with an absence of raw ends which are liable to become loose.

Other objects and advantages of the invention will be apparent during the course of the following description.

In the drawings I have shown one embodiment of the invention. In this showing,

Figure 1 is a perspective view of the ends of two strips of cane or the like,

Figure 2 is a similar view showing the cane ends prepared for splicing,

Figure 3 is a similar view showing the method of starting the splice,

Figure 4 is a face view of the completed splice, and,

Figure 5 is an edge view of the same.

Referring to the drawings the numeral 10 designates the end of a strip of cane which it is desired to splice to a second strip 11. In carrying out the method of the present invention one of the strips of cane, as for instance the strip 10, which is provided with an opening 12 preferably formed as a parallelogram. The opening 12 may be of any desired width and in length it is preferably equal to the width of one of the cane strips. The strip 11 is notched upon opposite sides as at 13 at points spaced from the extremity of the strip and the extremity is preferably tapered inwardly at its edges as at 14. For a substantial distance from the extremities of the strips the under sides thereof are tapered as at 15 so that the strips are comparatively thin at their extremities.

In carrying out the method the opening 12 and notches 13 may be stamped, punched or otherwise provided and in assembling the ends of the strips to form the splice the end of the strip 11 is inserted within the opening 12 in the manner shown in Figure 3 of the drawings. As stated the length of the opening 12 is substantially equal to the width of the cane strips so that the end of the strip 11 may be freely inserted within the opening 12 as shown in Figure 3. The strip 11 is inserted within the opening 12 until the notches 13 are arranged opposite the edges of the opening 12. The strip 11 is then turned through a half circle so that the neck formed by the notches 13 is arranged edgewise within the opening 12. The notches 13 are preferably of such a depth that the neck formed therebetween is equal in width to the width of the opening 12 as shown in Figure 4. After the strip 11 has been turned so that the neck between the notches 13 is arranged edgewise of the opening the outer portion of the strip 11 is drawn downwardly to form a continuation of the strip 10. It will be apparent that the extremity of the strip 10 will be concealed beneath the strip 11 while the extremity of the strip 11 will be concealed beneath the strip 10 so that the raw edges of the ends cannot become loose. If desired the contacting portions of the strips of the completed splice may be provided with glue but inasmuch as the outer ends of the notches 13 will engage one end of the opening 12 it will be apparent that the strip 11 cannot be withdrawn under normal conditions of operation while the strips are in alinement as shown in Figure 5. While I have shown the end of the strip 11 as being tapered at 14 it will be obvious that the taper is provided merely for convenience when inserting this end within the opening 12. The taper 14 may be provided with the safe punching operation as the notches 13 or the taper may be entirely omitted. By tapering the under sides of the ends of the strips it will be apparent that the splice forms a relatively flat joint which is pratically invisible.

It is to be understood that the form of my invention herewith shown and described is to be taken as a preferred example of the same and that various changes in the shape, size, and arrangement of parts may be resorted to without departing from the spirit of the invention or the scope of the subjoined claim.

Having described my invention, I claim:

An interlocking joint comprising two independent ends tapered on one side from their extremities to points spaced a material distance therefrom whereby they are reduced in thickness toward their extremities, one of said ends being provided intermediate the ends of its tapered portion with a relatively narrow rectangular longitudinal slot, the other of said ends being substantially equal in width to the length of said slot and provided on opposite sides intermediate the ends of its tapered portion with transversely alined rectangular notches forming a shank substantially equal in width to that of said slot, said second named end being adapted to be inserted in said slot with its width arranged lengthwise thereof and turned to arrange said shank transversely of said slot and snugly fitting therein, the portions of each end outwardly of said slot and said shank being adapted to be arranged against the other end inwardly of said slot and said shank.

In testimony whereof, I affix my signature.

JOSEPH HENRY BLAIR.